Feb. 23, 1971    G. DARNELL    3,564,660
INJECTION MOLDING MACHINE
Filed Dec. 9, 1968    3 Sheets-Sheet 1

INVENTOR
GEORGE DARNELL
BY
Amster & Rothstein
ATTORNEYS

INVENTOR
GEORGE DARNELL
BY Amster & Rothstein
ATTORNEYS

Feb. 23, 1971    G. DARNELL    3,564,660
INJECTION MOLDING MACHINE
Filed Dec. 9, 1968    3 Sheets-Sheet 3
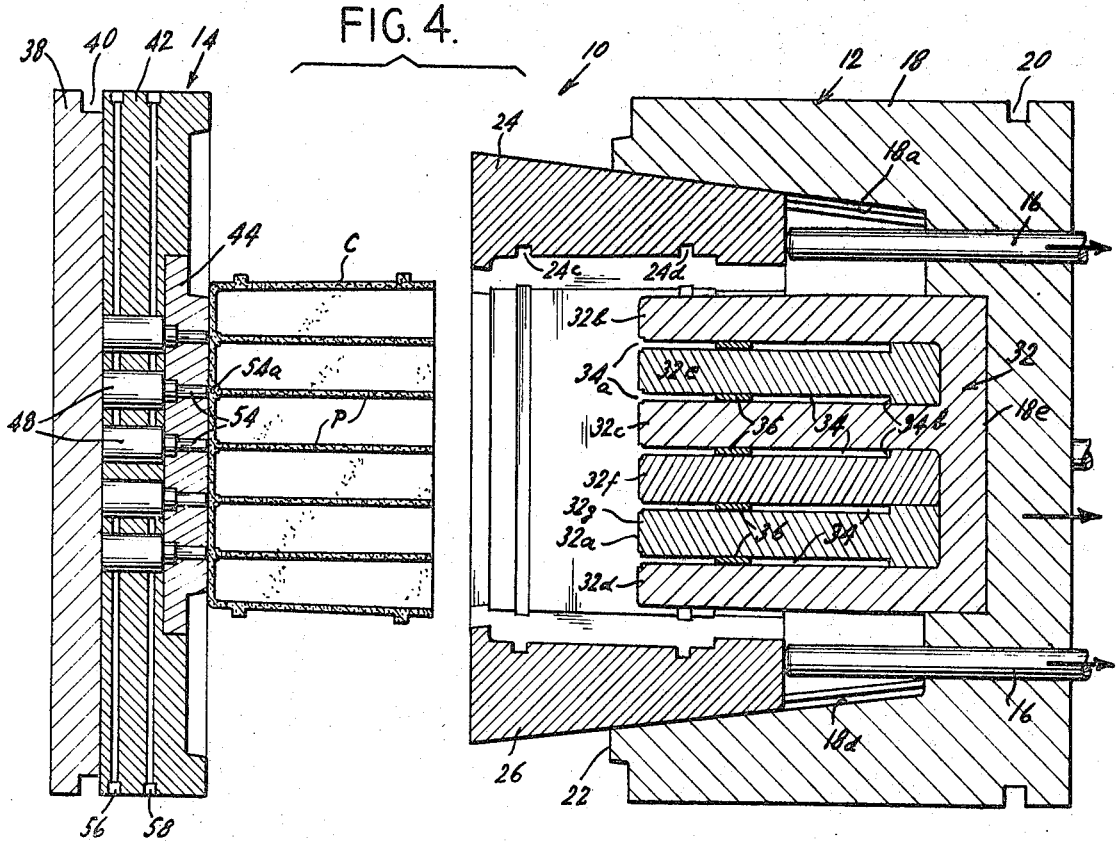
FIG. 4.
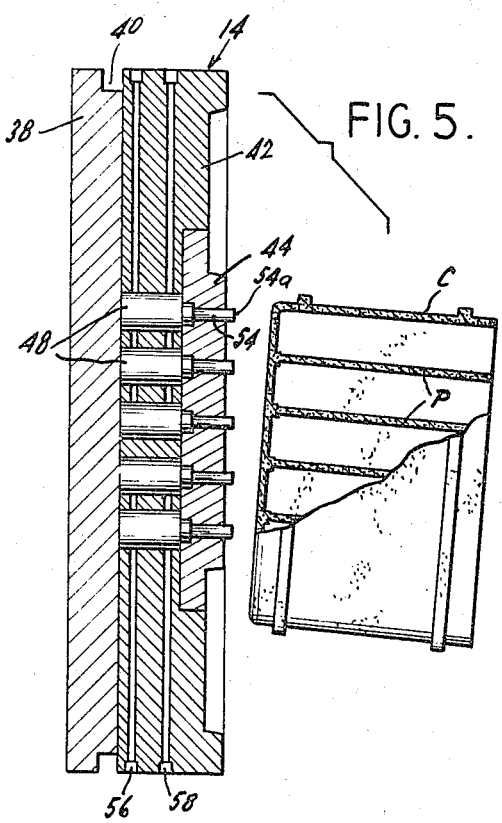
FIG. 5.
FIG. 6.
INVENTOR
GEORGE DARNELL
BY Amster & Rothstein
ATTORNEYS ated Feb. 23, 1971

3,564,660
INJECTION MOLDING MACHINE
George Darnell, 40 Mount Joy Ave.,
Scarsdale, N.Y. 10583
Filed Dec. 9, 1968, Ser. No. 782,097
Int. Cl. B29c 7/00
U.S. Cl. 18—42                                    16 Claims

ABSTRACT OF THE DISCLOSURE

An injection molding machine for molding a box-like object having plural internal walls forming corresponding compartments separated by partitions, such as carrying cases or boxes for the dairy and beverage industries, in which the machine includes a mold having an ejection section and an injection section, with provision on the ejection section for forming all of the essential structural elements of the molded object.

---

The present invention relates generally to injection molding machines, and in particular to an improved mold for molding an object having external walls forming a box-like body and internal walls forming a plurality of internal partitions, such as a box or carrying case for the dairy and beverage industries.

The design of molds for the molding of large multi-compartment objects, such as dairy and beverage cases, presents a difficult problem, both with respect to the actual manufacture of the mold and utilization of the mold in injection molding machine such that the cost of the end product will not become prohibitive. With the advent of electrical discharge machining, which involves the use of an electrode to erode a steel cavity under a precisely controlled high or low frequency impulse, substantial cost reduction can be introduced into the manufacture of large size molds, and in particular, molds having segmented internal cores which define corresponding partitions and internal compartments of the molded object. Typically, the production of an injection mold cavity involves the preparation of wood or epoxy pattern which is then duplicated in graphite. A steel cavity is then milled from the pattern using electrical discharge machining employing a graphite hob, with the mold being finished and polished in accordance with procedures which are generally understood.

These techniques have been successfully employed in making molds of conventional construction. Typically, in the manufacture of a case having a number of internal compartments separated by partitions, the ejection section of the mold is provided with a cavity defining the external or bounding walls of the object and a core is provided projecting from the injection section of the mold which is received within the cavity to define internal walls, and to the extent feasible, partitions, etc. Difficulties are experienced in stripping the molded part from this type of mold. Also, with the core projecting from the injection section, it is necessary to employ molding machines of relatively large size which bring about a corresponding increase in the cost of the molded object. It would be highly desirable if a molding technique and corresponding mold construction could be developed which would enable the molding, in a single shot, of box like objects having internal partitions and compartments, with the ability to readily strip the molded object from the mold at the completion of the molding cycle and with the capability of operating the mold in comparatively smaller injection-molding machines.

Broadly, it is an object of the present invention to provide an improved molding technique and apparatus which realizes one or more of the aforesaid objectives. Specifically, it is within the contemplation of the present invention to provide an improved mold for molding box-like, multi-compartment objects, such as cases for transporting milk and beverage bottles, containers, cans, and similar multi-compartment structures such as the cases for automotive batteries wherein the plural cells of the battery are accommodated within individual cell compartments separated by internal partitions.

I have found that by using special stripping and stabilizing techniques, it is possible to construct a mold for objects of this kind wherein the ejection section of the mold includes substantally all of the mold detail such that the injection section is reduced to a very simple structure for defining only the top of the molded object. In accordance with an illustrative embodiment demonstrating objects and features of the present invention there is provided an injection molding machine for molding an object having external walls forming a box-like body and internal walls forming plural partitions (i.e., a battery case) which comprises a mold including an ejection section and an injection section cooperating with each in a closed position for molding the object. The ejection section includes a chase, movable cam-action parts mounted in the chase and defining the external walls of the box-like body and a segmented core bounded by the cams and mounted in a chase. The core has plural cuts defining corresponding plural partitions, with each of the cuts having an exit end opening toward the injection section and a base end. Respective movable stripper blades are mounted in the cuts contiguous to the base ends thereof and are movable toward the exit ends, and the corresponding free end of the segmented core. Means are provided which are operable in response to opening of the ejection and injection sections of the mold for moving both the cam-action parts and the stripper blades to displace the molded object relative to the injection section for stripping thereof. Advantageously, the injection section of the mold, which is in the form of a simple cap plate bridging the core in the closed position of the mold carries combined holding and stripping means which function both to stabilize the segmented core during molding and to displace the molded object relative to the injection section for stripping thereof at the completion of the molding cycle.

The above brief description, as well as further objects, features and advantages of the present invention will be more fully appreciated by reference to the following detailed description of a presently preferred, but nonetheless illustrative embodiment in accordance with the present invention, when taken in conjunction with the accompanying drawing wherein:

FIG. 4 is a sectional view similar to FIG. 3 but showing the mold in its completely open position, with the molded part completely stripped from the ejection section of the mold and supported on the injection section thereof;

FIG. 5 is a sectional view of the injection section of the mold only in its condition after the molded object has been stripped from the mold;

FIG. 6 is a perspective view, with parts exploded, showing a typical core construction for the mold.

Figure 1:
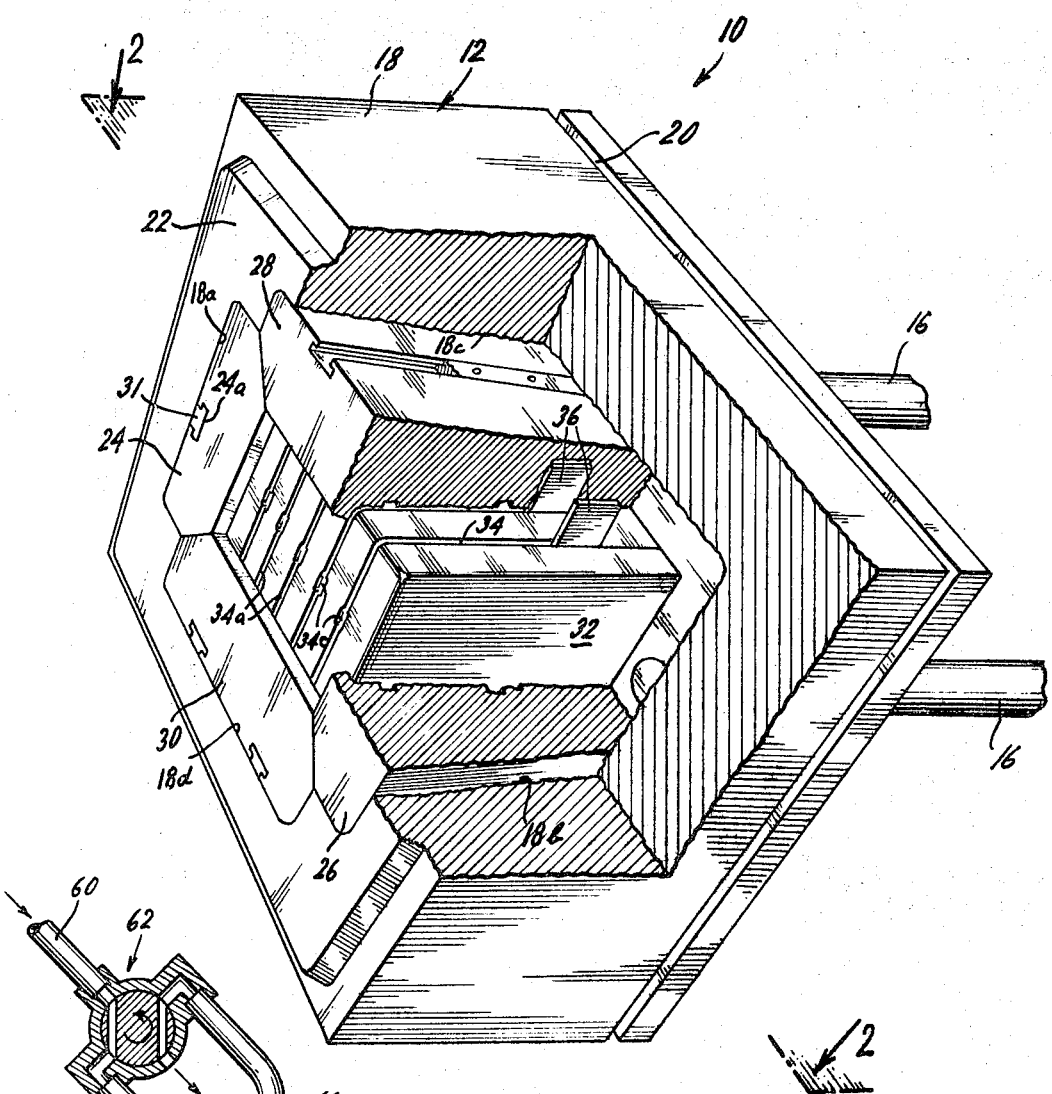
FIG. 1 is a perspective view, with parts broken away and sectioned, showing the ejection section of a mold embodying features of the present invention.
Figure 2:
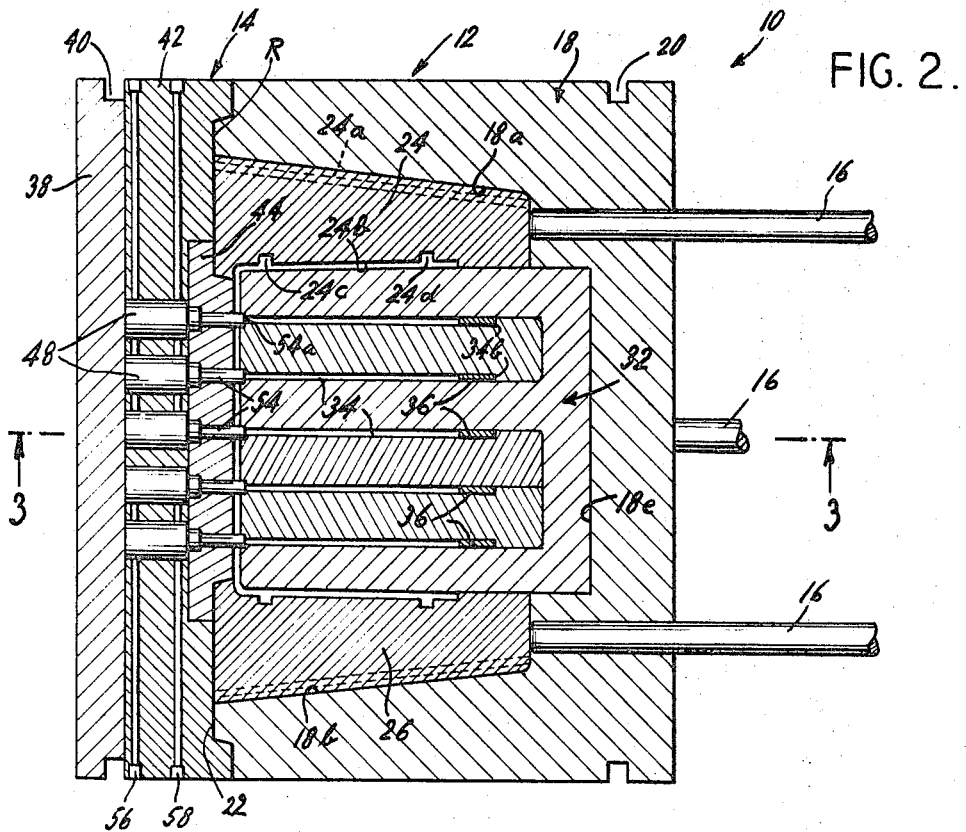
FIG. 2 is a sectional view taken substantially along the line 2—2 of FIG. 1 but additionally showing the injection section of the mold with the injection and ejection sections being in the closed molding position.

Referring now specifically to the drawings and in particular to FIGS. 1 and 2 thereof, there is shown an improved mold, generally designated by the reference numeral 10, for incorporation into an injection-molding machine in accordance with the present invention. The mold 10 includes an ejection section 12 which provides all of the essential detailing for the molded object, which in this illustrative embodiment is a battery case C (see FIG. 3 to 5). Additionally, the mold 10 includes an injection section 14 which serves to cap the mold, to inject the plastic material, to stabilize the mold core during the injection and molding cycle and to finally strip the molded object C at the completion of the molding cycle. As is generally understood, the mold 10 is mounted in an injection-molding machine (not shown) by mounting the injection section 14 on a stationary injection plate and by mounting the ejection section 12 on a movable ejection plate. During the molding cycle, the ejection section 10 is moved in a closed molding position relative to the injection section 14, with the mold sections 12, 14 meeting in the parting plane R. At the completion of the molding cycle, the movable ejection section 12 moves away from the stationary injection section 14 relative to knock-out or stripper pins 16 on the molding machine proper, as shown progressively in FIGS. 2 to 4 inclusive, for opening the mold to a position wherein the molded object C can be stripped from the injection section (see FIG. 5). Since the molding machine itself is conventional, details thereof are not shown but are generally understood by those skilled in this art.

Reference will now be made to FIG. 1 for a detailed description of the ejection section 12 of the mold 10 which is seen to include a chase 18 which has a peripheral groove 20 contiguous to its rearward end for mounting of the ejection section 12 of the mold on the ejection platen. At its forward end, the chase 18 is provided with a raised contacting surface 22 which engages the injection section 14 of the mold in the parting plane P, as is generally understood. Within the chase, there is slidably mounted four cam-action mold parts 24, 26 and 28, 30 which define an internal cavity and the opposite end and side walls of the object C to be molded. The cam-action parts 24, 26 and 28, 30 which form the external walls for the molded box-like object C are all mounted in substantially identical fashion. Specifically, and as seen best in FIG. 1, the cam-action part 24 is formed on its rearward or outer surface with a T-shaped slot 24a which accommodates a corresponding T-shaped mounting rail 31 secured or formed on the adjacent surface of the chase. In similar fashion, the opposite cam-action part 26 is mounted on the chase in opposed relation to the cam-action part 24. The other pair of cam-action parts 28, 30 are similarly mounted, except that due to the length of these parts, it is preferable to employ two T-shaped slots and mounting rails or bars.

As is generally understood, the opposed pairs of internal chase walls 18a, 18b and 18c, 18d are tapered outwardly from the internal base wall 18e toward surface 22. The taper or outward inclination of the opposed pairs of chase walls is selected such that the cam-action, wall-forming parts 24, 26 and 28, 30 move outwardly relative to each other by pairs to enable the molded object C to be stripped from the mold in the open position (see FIG. 5). The internal cavity-forming surfaces of the cam-action wall-forming parts 24, 26 and 28, 30 are provided with the desired detailing for the corresponding external object walls, such as cuts 24c, 24d formed on cavity-forming wall 24b of cam-action part 24. In this illustrative embodiment, the cuts (i.e., cuts 24c, 24d) define two continuous circumferential projections formed on the exterior walls of the battery case C.

As seen in the several figures, the cam-action, wall-forming parts 24, 26 and 28, 30 define and bound a core-receiving cavity in which there is mounted a segmented core 32. The segmented core 32 is formed with a plurality of parallel slots, generally designated by the reference numeral 34, each of which is of a thickness to define a corresponding partition within the final molded object. The slots 34 each have an exit end 34a opening toward the injection section 14 of the mold through the front face 32a of the core 32 and a base end 34b spaced inwardly from the front face 32a. Various techniques may be employed for the manufacture of the segmented core 32 with its plural cuts or slots extending inwardly from the front face 32a thereof to define the multiple core segments 32b, etc. For example, and as seen in FIG. 6 the core proper may be of a substantially E-shaped piece providing integral segments 32b, 32c and 32d. Between segments 32b, 32c insert 32e may be mounted with the opposite faces thereof being relieved away to form in conjunction with the confronting faces of segments 32b, 32c corresponding slots or cuts 34 for the desired internal partitions at this location. A similar technique may be employed between segments 32c, 32d, this time employing two inserts 32f, 32g to complete the plural segments of the mold defining the corresponding internal partitions of the molded object C. It will of course be appreciated that this is but one illustrative technique for building the core 32 and that core may be manufactured in a variety of other ways including the formation thereof out of a single solid piece of metal using electrical discharge machining.

Figure 3:
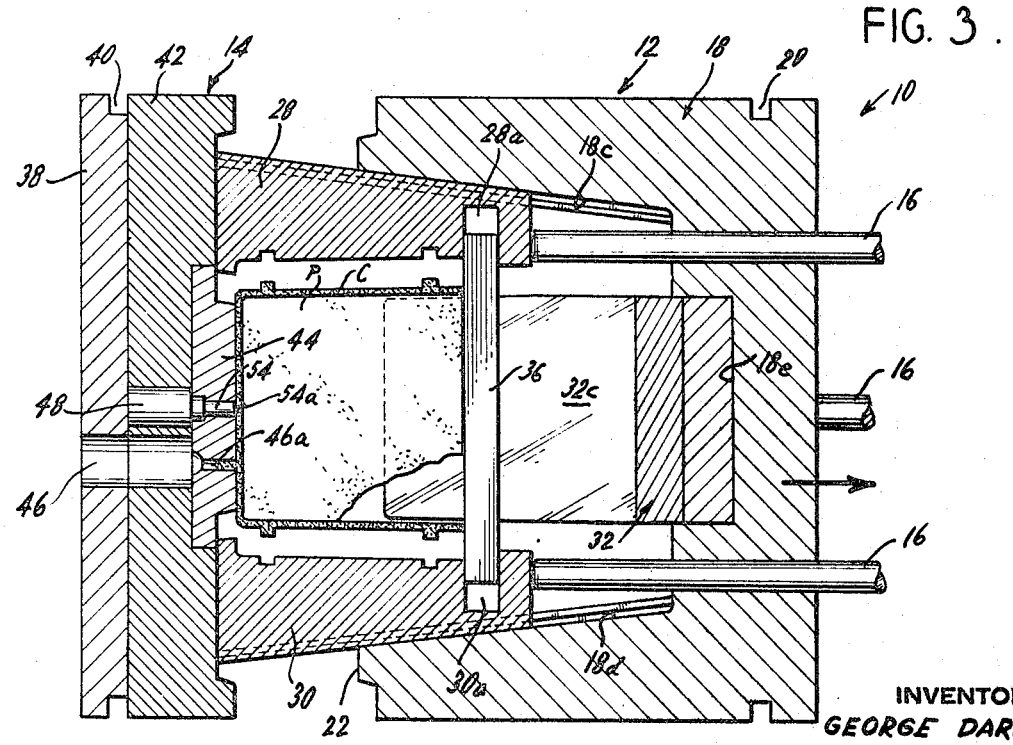
FIG. 3 is a sectional view taken along the line 3—3 of FIG. 2 showing the ejection section of the mold in a partially open position relative to the injection section and with the molded object partially stripped from the ejection section of the mold.

Disposed within each of the slots 34 of the segmented core 32 contiguous to the base ends 34b thereof are respective stripper blades 36 which are movable toward and away from the corresponding exit ends 34a of the slots or cuts 34. The stripper blades 36 extend laterally beyond the segmented core 32, as seen in FIG. 3, and are received in laterally extending seats 28a, 30a formed in the trailing ends of the cam-action parts 28, 30. Thus, as the cam-action parts 28, 30 are displaced relative to the chase 18 of the mold for stripping the molded object or chase C, the stripper blades 36 bear against the upper edges of the corresponded molded partitions P to assist in such function by stripping the partitions from the slots 34 in the segmented core 32. In constructing the segmented core 32, it will be appreciated that the slots 34 and the corresponding upper edges of the partitions are defined by the plane of the leading edges of the stripper blades 36. Thus, the effective depth of the slots 34 are diminished by the width of the stripper blades and there lengthwise extend into the slots 34 contiguous to the base ends 34b thereof. Effectively, during stripping or release of the molded case C from the cavity and segmented core 32 of the mold, stripping forces will be exerted on all four external walls by the cam-action, wall-forming parts 24, 26 and 28, 30 as well as on the ends of the partitions P by the multiple blades.

Turning now to the injection section 14 of the mold 10, it is seen to include a backup plate 38 which has a peripheral slot 40 to facilitate mounting of the backup plate on the relatively stationary injection platen. Coextensive with and mounted on the backup plate is a combined inlet and cap support 42 which is formed with a centrally disposed seat receiving the cap plate 44 of the mold which bridges and closes the cavity of core 32, as seen best in FIG. 2. As seen in FIG. 3, the backup plate 38 and air inlet and cap support 42 are provided with a bore 46 which is connected through bore extension 46a in the cap plate 44 to provide the usual entry passage for the injection of plastic. Other conventional techniques may be used to provide runners for the purposes of injecting plastic into the mold during the molding cycle.

Figure 7:
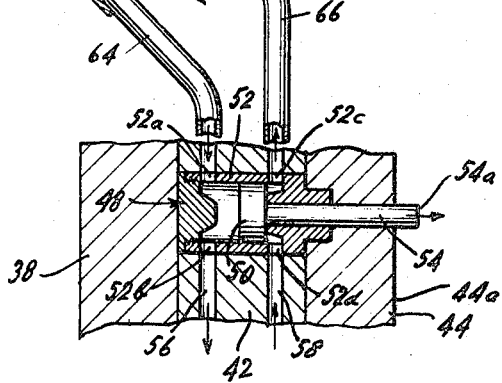
FIG. 7 is a fragmentary sectional view, with parts broken away, showing details of the combined holding and stripping pins in the injection section of the mold, with typical valving for operating pneumatic actuating means for the holding and stripping pins.

The cap plate 44 of the injection section 14 of the mold is provided with plural combined holding and stripping means, generally designated by the reference numeral 48, and shown in detail in FIG. 7 which corresponds in number to the cuts or slots 34 in the segmented mold 32. These means function during the molding operation to stabilize the free ends of the segments of the core 32 (see FIG. 2) and, after molding, to strip the molded object C from the injection section 14 of the mold 10 (see FIG. 5). Referring to FIG. 7, the combined holding and stripping means is seen to include a double-acting piston and cylinder including piston 50, cylinder 52 and piston rod 54. The cylinders 52 are configured such that they may be mounted in bores cut in the port 42, bearing at their rearward ends against the adjacent face of the backup plate 38 and seating at their forward ends within the cap plate 44. The piston rod 54, serving as a stabilizing and stripping pin, projects through the wall 44a of the plate 44, with each of such pins terminating in a leading bearing face 54a. These bearing faces have essentially three functions. In a first position wherein they project beyond wall 44a they bear against the mold segments, straddling the successive slots 34 thereof. Conveniently the free ends of the mold segments are notched, as indicated at 34c, to accommodate the leading ends of the pins 54 to initially stabilize the segmented core 32. During the final phase of the injection of the plastic into the mold and when the space between the segments of the core are substantially filled with plastic to form the partitions P, the stabilizing pins 54 are retracted such that their faces 54a are approximately coplanar with face 44a such that a smooth and uninterrupted bottom wall is formed for the molded object C. This retracted position is illustrated in FIGS. 3 and 4. After the molding cycle is completed and the mold has fully opened (see FIG. 4), the stabilizing pins 54 are again projected beyond surface 44a in an amount sufficient to strip the molded object C from the injection section of the mold, as seen in FIG. 5.

The pistons 50 of cylinders 52 of the pneumatic holding and stripping means 48 are each of the double-acting type. Thus, each cylinder has pairs of inlets 52a, 52b and 52c, 52d arranged on opposite sides of piston 50 for the purpose of selectively positioning the pistons and corresponding pins 54. The several cylinders are interconnected by common air inlets 56, 58 which extend to the opposite sides of the injection section 14 of the mold. In any appropriate fashion air inlets 56, 58 which are selectively connected to a source of air under pressure which may be provided over main supply lne 60 through conventional valving 62 and supply conduits 64, 66. If desired, identical valving may be arranged at opposite sides of the injection section 14 and connected to the corresponding ends of the air inlets 56, 58. Both would be of the type illustrated in FIG. 7, with one air supply system being effective to drive the pins 54 through the requisite stroke for establishing the stabilizing position shown in FIG. 2, followed by porting to atmosphere to establish the retracted position shown in FIG. 4 and with the other air supply system being arranged to advance the pins 54 through the requisite stroke for the stripping function. Since the valving arrangement is subject to a latitude of modification, substitution and change, further description will be dispensed with in the interest of brevity.

A typical molding cycle will now be described in detail:

As the ejection section 12 of the mold moves toward the injection section 14, stripper or knockout pins 16 retract. The leading ends of the cam-action, wall-defining parts 24, 26 and 28, 30 contact the relatively stationary injection section 14 and the mold closes to the position illustrated in FIG. 2. The pneumatic control is operated to condition valve 62 to the position illustrated in FIG. 7 wherein air is supplied from main supply line 60 via the rotary valve, conduit 64 and internal air inlet 56 to one side of the pistons 50 to drive the respective pins 54 to the stabilizing position illustrated in FIG. 2. The other sides of the pistons are ported to atmosphere via conduit 66 and valve 62. Plastic is then injected into the mold. When the mold cavity is substantially filled, the pins 54 are retracted to the position illustrated in FIG. 3, by the manipulation of the valving illustrated in FIG. 7. When the molding cycle has been completed, the ejection section 12 of the mold moves away from the injection section whereupon the cam-action, wall-forming parts 24, 26, and 28, 30 are moved forwardly relative to the chase 18 of the mold, with the stripper blades 36 also moving due to their connection of two parts 28, 30 (see FIG. 3). Accordingly, stripping forces are exerted on the external walls of the molded part as well as on the free ends of partitions P. After the mold is moved to the fully opened position illustrated in FIG. 4, the pins 54 are once again actuated by the pneumatic system (i.e., the duplicate arrangement at the opposite side of the mold) to strip the molded object C from the injection section 14 of the mold.

A latitude of modification, change and substitutions intended in the foregoing disclosure and it is appropriate that the invention be construed broadly and consistent with the scope of the appended claims.

What I claim is:

1. In an injection molding machine for molding an object having external walls forming a box-like body and internal walls forming plural partitions; a mold including an ejection section and an injection section cooperating with each other in a closed position for molding the object; said ejection section including a chase, movable cam-action parts in said chase and defining said external walls, a segmented core bounded by said cam-action parts and mounted in said chase, said core having plural cuts defining said plural partitions and each having an exit end opening toward said injection section and a base end and respective movable stripper blades mounted in said cuts contiguous to said base ends and movable toward said exit ends; and means operable in response to opening movement of said ejection and injection sections of said mold for moving both said cam-action parts and stripper blades to displace the molded object relative to said ejection section for stripping thereof.

2. An injection molding machine according to claim 1, said injection section including a cap plate bridging said core in said closed position of said mold.

3. An injection molding machine according to claim 2, said injection section including holding means operable in said closed position of said mold and bearing against said core at said exit ends of said cuts for stabilizing said segmented core during molding.

4. An injection molding machine according to claim 2, said injection section including stripping means operable after opening of said mold for displacing the molded object relative to said injection section for stripping thereof.

5. An injection molding machine according to claim 2, said injection section including combined holding and stripping means operable during molding for stabilizing said segmented core and after molding for stripping the molded object from said injection section.

6. An injection molding machine according to claim 5 wherein said combined molding and stripping means includes movable pins straddling the exit ends of said cuts and bearing against said segmented core and pneumatic actuating means for each of said pins.

7. An injection molding machine according to claim 6 wherein said pneumatic actuating means is a double acting piston and cylinder, a corresponding pin being operatively connected to the piston thereof.

8. A mold for molding an object having external walls forming a box-like body and internal walls forming plural partitions, said mold including an ejection section and an injection section cooperating with each other in a closed position for molding the objects, said ejection section including a chase, movable cam-action parts in said chase and defining said external walls, a segmented core bounded by said cam-action parts and mounted in said chase and stripper blades mounted between the segments of said core and adapted to move with said cam-action parts to displace the molded object relative to said ejection section for stripping thereof.

9. A mold according to claim 8, said injection section including holding means operable in said closed position of said mold and bearing against said segmented core for stabilizing the same during molding.

10. A mold according to claim 8, said injection section including stripping means operable after opening of said mold for displacing the molded object relative to said injection section for stripping thereof.

11. A mold according to claim 8, said injection section including combined holding and stripping means operable during molding for stabilizing said segmented core and after molding for stripping the molded object from said injection section.

12. An injection molding machine for molding an object having external walls forming a box-like body and internal walls forming plural partitions; a mold including a movable ejection section and a stationary injection section cooperating with each other in a closed position for molding the object; said ejection section including a chase having a cavity, means in said chase bounding said cavity and defining said external walls, a core within said cavity having plural spaced segments defining said plural partitions and movable stripper blades mounted between at least some of said segments and movable relative thereto; said injection section including a cap plate bridging said cavity in said closed position of said mold; and means operable in response to movement of said ejection section away from said injection section of said mold for displacing said stripper blades to strip the molded object from said ejection section.

13. An injection molding machine according to claim 12, said injection section including holding means operable in said closed position of said mold and bearing against said segmented core for stabilizing said segmented core during molding.

14. An injection molding machine according to claim 12, said injection section including stripping means operable after opening of said mold for displacing the molded object relative to said injection section for stripping thereof.

15. An injection molding machine according to claim 12, said injection section including combined holding and stripping means operable during molding for stabilizing said segmented core and operable after molding for stripping the molded object from said injection section.

16. An injection molding machine according to claim 15 wherein said combined molding and stripping means including movable plural pins straddling the exit ends of said cuts and bearing against said segmented core and pneumatic actuating means for each of said pins.

References Cited

UNITED STATES PATENTS

| | | | |
|---|---|---|---|
| Re. 19,780 | 12/1935 | McKay | 18—Cameo Digest |
| 2,542,263 | 2/1951 | Schultz | 18—19J |
| 1,826,942 | 10/1931 | McKay | 18—19J |
| 2,529,091 | 11/1950 | Lester | 18—Undercut Digest |
| 3,357,058 | 12/1967 | Kutik | 18—42D |
| 3,004,291 | 10/1961 | Schad | 18—42D |

FOREIGN PATENTS

| | | | |
|---|---|---|---|
| 532,815 | 1/1931 | Germany | 18—19BJ |

CHARLES W. LANHAM, Primary Examiner

A. L. HAVIS, Assistant Examiner

U.S. Cl. X.R.

18—19J